United States Patent
Anderson et al.

(10) Patent No.: US 9,290,403 B2
(45) Date of Patent: Mar. 22, 2016

(54) REPOSITIONABLE HEATER ASSEMBLIES FOR GLASS PRODUCTION LINES AND METHODS OF MANAGING TEMPERATURE OF GLASS IN PRODUCTION LINES

(71) Applicant: Corning Incorporated, Corning, NY (US)

(72) Inventors: James Gary Anderson, Dundee, NY (US); Steven Roy Burdette, Big Flats, NY (US); Vladislav Yuryevich Golyatin, Avon (FR); Jon Anthony Passmore, Painted Post, NY (US); George Clinton Shay, Hardy, VA (US)

(73) Assignee: CORNING INCORPORATED, Corning, NY (US)

( * ) Notice: Subject to any disclaimer, the term of this patent is extended or adjusted under 35 U.S.C. 154(b) by 116 days.

(21) Appl. No.: 13/776,014

(22) Filed: Feb. 25, 2013

(65) Prior Publication Data

US 2014/0238077 A1    Aug. 28, 2014

(51) Int. Cl.
   *C03B 17/06* (2006.01)
   *C03B 18/10* (2006.01)

(52) U.S. Cl.
   CPC .................... *C03B 17/067* (2013.01)

(58) Field of Classification Search
   CPC .. C03B 17/067; C03B 17/064; C03B 25/025; C03B 18/02; C03B 25/12; C03B 17/06; C03B 25/08; C03B 29/12; C03B 27/012
   USPC .......................................................... 65/95
   See application file for complete search history.

(56) References Cited

U.S. PATENT DOCUMENTS

| | | | | |
|---|---|---|---|---|
| 3,161,711 A | * | 12/1964 | Milford | B29C 47/92 264/210.5 |
| 3,619,159 A | * | 11/1971 | Shirley | C03B 15/02 65/162 |
| 3,723,082 A | * | 3/1973 | Knowles et al. | C03B 17/064 65/162 |
| 3,782,873 A | * | 1/1974 | Lynnknowles | B29C 47/92 26/106 |
| 4,773,167 A | | 9/1988 | Jacobi, Jr. | 34/4 |
| 7,489,858 B2 | * | 2/2009 | Zank | F24C 7/065 126/19 R |

(Continued)

FOREIGN PATENT DOCUMENTS

CN    101028964 A    9/2007
EP      2253598 B1    5/2014

(Continued)

OTHER PUBLICATIONS

PCT/ISA/220 & PCT/US2014/017055 dated Jul. 3, 2014.

*Primary Examiner* — Jodi C Franklin
(74) *Attorney, Agent, or Firm* — Kevin M. Able

(57) ABSTRACT

Repositionable heater assemblies and methods of controlling temperature of glass in production lines using the repositionable heater assemblies are disclosed. The repositionable heater assembly includes a support frame, a first sled and a second sled each coupled to the support frame with bearing members that allow the first sled and the second sled to translate in a longitudinal direction. Each of the first sled and the second sled include at least one heating element, where the heating elements are spaced apart from the glass ribbon a spacing distance. The first and second sleds are movable in the longitudinal direction to controlling the spacing distance between the heating elements of the first sled and the second sled and the glass ribbon to manage temperature of the glass ribbon.

7 Claims, 5 Drawing Sheets

(56) References Cited

U.S. PATENT DOCUMENTS

| | | | |
|---|---|---|---|
| 7,770,414 B2* | 8/2010 | Cimo | C03B 23/037 65/106 |
| 7,984,625 B2 | 7/2011 | Markham et al. | |
| 8,210,001 B2* | 7/2012 | Allan | C03B 17/064 65/195 |
| 8,904,822 B2* | 12/2014 | Leblanc | C03B 17/064 65/162 |
| 2004/0154336 A1* | 8/2004 | Pitbladdo | C03B 17/064 65/53 |
| 2006/0042314 A1* | 3/2006 | Abbott, III | C03B 17/06 65/25.3 |
| 2006/0081009 A1* | 4/2006 | Maldonado | C03B 17/064 65/195 |
| 2007/0140311 A1* | 6/2007 | House | C03B 17/064 374/100 |
| 2009/0100873 A1* | 4/2009 | Allan | C03B 17/064 65/85 |
| 2009/0113938 A1* | 5/2009 | Watanabe | C03B 5/225 65/134.9 |
| 2009/0217705 A1 | 9/2009 | Filippov et al. | |
| 2009/0242537 A1* | 10/2009 | Nishimoto | C03B 17/061 219/201 |
| 2009/0243133 A1 | 10/2009 | Wong et al. | 264/40.6 |
| 2010/0218557 A1* | 9/2010 | Aniolek | C03B 17/067 65/97 |
| 2011/0209502 A1* | 9/2011 | El Kahlout | C03B 17/064 65/90 |
| 2011/0289967 A1* | 12/2011 | Burdette | C03B 17/067 65/29.19 |
| 2012/0111055 A1* | 5/2012 | Allan | C03B 17/064 65/29.18 |
| 2012/0159990 A1* | 6/2012 | Tsuda | C03B 17/064 65/53 |
| 2013/0008208 A1* | 1/2013 | Kariya | C03B 17/067 65/53 |
| 2013/0074549 A1* | 3/2013 | Ahrens | C03B 17/064 65/29.21 |
| 2014/0123703 A1* | 5/2014 | LeBlanc | C03B 17/064 65/29.1 |

FOREIGN PATENT DOCUMENTS

| | | | |
|---|---|---|---|
| KR | 10-20100124197 A | 11/2010 | |
| WO | WO2006/130143 | 7/2006 | B29C 55/14 |
| WO | 2011-066064 A2 | 6/2011 | |

\* cited by examiner

REPOSITIONABLE HEATER ASSEMBLIES FOR GLASS PRODUCTION LINES AND METHODS OF MANAGING TEMPERATURE OF GLASS IN PRODUCTION LINES

BACKGROUND

1. Field

The present disclosure generally relates to repositionable heater assemblies used in glass production lines and methods of managing temperature of glass in production using repositionable heater assemblies.

2. Technical Background

Glass may be manufactured according to a variety of techniques including being manufactured in a draw operation. Glass manufactured in a draw operation begins as glass constituents in a molten state that are shaped into a glass ribbon. As the glass ribbon decreases in temperature, the glass ribbon passes through a visco-elastic transition and into an elastic state. Once in the elastic state, segments of the glass ribbon may be sectioned into glass sheets by trimming the glass ribbon.

Internal stress levels of the glass ribbon, and therefore finished glass sheets, may be affected by variation in the temperature of the glass ribbon in the visco-elastic transition. Accordingly, heater assemblies for glass production lines and methods of managing temperature of glass in a production line may be desired.

SUMMARY

Glass manufactured in a draw operation undergoes phase transformations as the temperature of the glass ribbon is decreased. In general, as the glass ribbon develops structure in the visco-elastic transition such that the glass ribbon begins to hold dimensional shape. To draw the glass ribbon to the desired dimensions, draw wheels may introduce force to the glass ribbon in the down-draw direction and in the cross-draw direction. The forces introduced during the visco-elastic transition may maintain a desired thickness of the glass ribbon as the glass ribbon transitions to an elastic state. Variations in temperature of the glass ribbon may induce thermal stress into the glass ribbon due to uneven contraction of the glass ribbon. These thermal stresses may be undesirable, as they may, for example cause warping of the glass.

To attenuate stress in finished glass articles, the thermal stresses in the glass ribbon are managed in the visco-elastic region of the glass ribbon. Heater assemblies according to the present disclosure may be positioned within the glass manufacturing line at a position corresponding to the visco-elastic region of the glass ribbon. The heater assemblies direct heat to the glass ribbon to locally modify the temperature gradient of the glass ribbon. In some embodiments, the heater assemblies may reduce the temperature variation in the cross-draw direction of the glass ribbon, thereby reducing the thermal stresses in the glass ribbon. To increase the responsiveness of the glass ribbon to the heat input by the heater assemblies, the heater assemblies may be repositionable with respect to the glass ribbon such that the heater assemblies are positioned proximate to the glass ribbon during normal operation and positioned distally from the glass ribbon in the event of glass manufacturing start-up or defect detection of the glass ribbon.

Accordingly, embodiments of the repositionable heater assembly according to the present disclosure include a support frame and a first sled and a second sled each coupled to the support frame with bearing members that allow the first sled and the second sled to translate in a longitudinal direction. Each of the first sled and the second sled include at least one heating element coupled to attachment surfaces, where the heating elements are spaced apart from the glass ribbon a spacing distance. The repositionable heater assembly includes a first actuator coupled to the first sled and the support frame and an electronic controller communicatively coupled to the first actuator controlling the spacing distance between the heating elements of the first sled and the glass ribbon.

Further, according to various embodiments, methods of controlling temperature of a glass ribbon in a draw process include drawing a glass ribbon in a visco-elastic state in a down-draw direction through a draw apparatus having a plurality of roller pairs and heating the glass with a repositionable heater assembly. The repositionable heater assembly includes a support frame, a first sled and a second sled each coupled to the support frame with bearing members that allow the first sled and the second sled to translate in a longitudinal direction. Each of the first sled and the second sled include at least one heating element coupled to attachment surfaces, where the heating elements are spaced apart from the glass ribbon a spacing distance. The repositionable heater assembly further includes a first actuator coupled to the first sled and the support frame, and a second actuator coupled to the second sled and the support frame. The method of controlling temperature further includes controlling the spacing distance between the heating elements of the first sled and the second sled with an electronic controller communicatively coupled to the first actuator and the second actuator.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description described various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
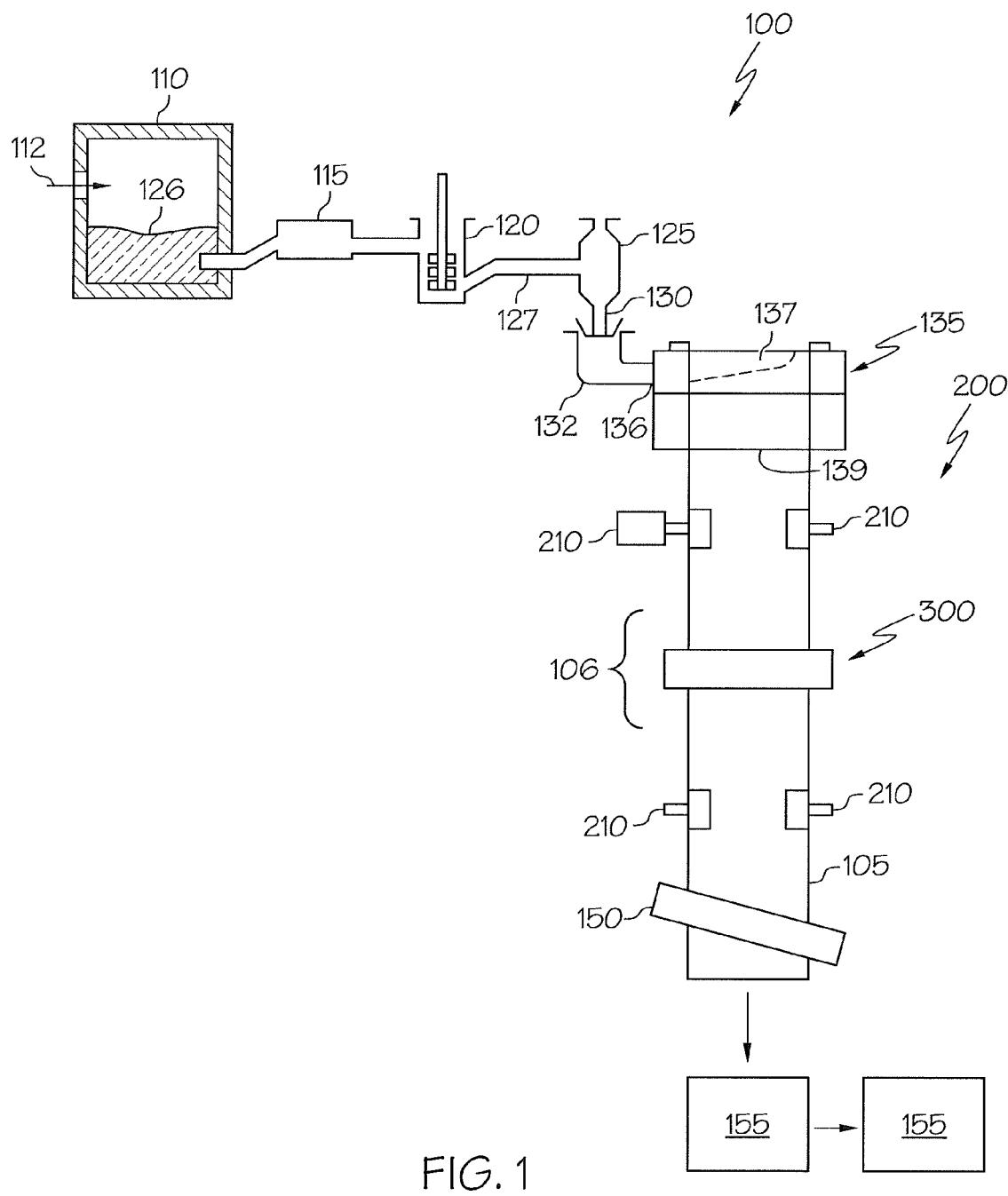
FIG. 1 schematically depicts a plan view of a glass manufacturing apparatus for forming a glass ribbon in a draw process that includes a repositionable heater assembly according to one or more embodiments shown or described herein.

Reference will now be made in detail to embodiments of repositionable heater assemblies for glass manufacturing apparatuses and methods of managing temperature of glass in glass manufacturing apparatuses. Referring in general to FIG. 1, a glass manufacturing apparatus for producing glass according to a draw method is depicted. A glass ribbon is formed in the glass manufacturing apparatus and is passed through a draw apparatus. A repositionable heater assembly is positioned along the draw apparatus. The repositionable heater assembly includes a first sled and a second sled, each of the first and second sleds including at least one heating element. The first sled and the second sled are repositionable with respect to the glass ribbon such that the distance between the glass ribbon and the heaters of the first sled and the distance between the glass ribbon and the heaters of the second sled are adjustable. Movement of the first sled and the second sled may be controlled by actuators that are communicatively coupled to an electronic controller. The electronic controller directs translation of the first sled and the second sled based on operating parameters of the production line and properties of the glass ribbon.

Referring now to FIG. 1, an exemplary glass manufacturing apparatus 100 that incorporates a fusion process to produce a glass ribbon 105 is depicted. The glass manufacturing apparatus 100 includes a melting vessel 110, a fining vessel 115, a mixing vessel 120 (for example, a stir chamber 120), a delivery vessel 125, a forming apparatus 135, a draw apparatus 200, and a cutting apparatus 150 (for example, a traveling anvil machine (TAM) 150). The glass manufacturing apparatus 100 produces a continuous glass ribbon 105 from batch materials, first by melting and combining the batch materials into molten glass, distributing the molten glass into a preliminary shape, applying tension to the glass ribbon 105 to control the dimensions of the glass ribbon 105 as the glass cools and viscosity increases, and cutting discrete glass sheets 155 from the glass ribbon 105 after the glass has gone through a visco-elastic transition and has mechanical properties that give the glass sheets 155 stable dimensional characteristics.

In operation, batch materials for forming glass are introduced into the melting vessel 110 as indicated by arrow 112 and are melted to form molten glass 126. The molten glass 126 flows into the fining vessel 115, which is maintained at a temperature above that of the melting vessel 110. From the fining vessel 115, the molten glass 126 flows into a mixing vessel 120, where the molten glass 126 undergoes a mixing process to homogenize the molten glass 126. The molten glass 126 flows from the mixing vessel 120 to the delivery vessel 125, which delivers the molten glass 126 through a downcomer 130 to an inlet 132 and into the forming apparatus 135.

The forming apparatus 135 depicted in FIG. 1 is used in a fusion draw process to produce glass ribbon 105 that has high surface quality and low variation in thickness. The forming apparatus 135 includes an opening 136 that receives the molten glass 126. The molten glass 126 flows into a trough 137 and then overflows and runs down the sides of the trough 137 in two partial ribbon portions before fusing together below the root 139 of the forming apparatus 135. The two partial ribbon portions of the still-molten glass 126 rejoin with one another (e.g., fuse) at locations below the root 139 of the forming apparatus 135, thereby forming a glass ribbon 105.

The glass ribbon 105 is drawn downward from the forming apparatus by the draw apparatus 200. While the forming apparatus 135 is shown and described herein implements a fusion draw process, it should be understood that other forming apparatuses may be used including, without limitation, slot draw apparatuses and the like.

As further shown in FIG. 1, the draw apparatus 200 includes a plurality of roller pairs 210 that each include a front-side roller and a back-side roller that pinch the glass ribbon 105 therebetween. In some embodiments, the roller pairs 210 extend across the width of the glass ribbon 105. In other embodiments, the roller pairs 210 extend across a portion of the width of the glass ribbon 105. The roller pairs 210 contact the glass ribbon and apply draw forces to the glass ribbon 105 as the glass ribbon 105 is traversed along the draw apparatus 200.

As the glass ribbon 105 is drawn through the draw apparatus 200, the glass ribbon 105 has an opportunity to cool. Glass manufacturing apparatuses 100 having a plurality of roller pairs 210 may improve the control and consistency of the cross-draw tension and/or down-drawn tension in the area in which the glass ribbon 105 goes through a visco-elastic transformation. The draw forces applied to the glass ribbon 105 by the plurality of roller pairs 210 while the glass ribbon 105 is still in a visco-elastic state cause the glass ribbon 105 to pull or stretch, thereby controlling the dimensions of the glass ribbon 105 by controlling the tension applied to the glass ribbon 105 as the glass ribbon 105 translates along the draw apparatus 200. This area is defined as the setting zone 106 in which the stress and flatness are set into the glass ribbon 105.

As depicted in FIG. 1, the glass manufacturing apparatus 100 further includes a repositionable heater assembly 300 positioned proximate to the draw apparatus 200 such that the repositionable heater assembly 300 is positioned proximate to the setting zone 106 of the glass ribbon 105. While specific mention is made herein to the repositionable heater assembly 300 being positioned proximate to the draw apparatus 200 at a position corresponding to the glass ribbon 105 undergoing the visco-elastic transformation, it should be understood that repositionable heater assemblies 300 according to the present disclosure may be positioned in other locations along the draw apparatus 200, for example and without limitation, at locations where the glass ribbon 105 undergoes a heating operation to anneal the glass ribbon 105.

Figure 2:
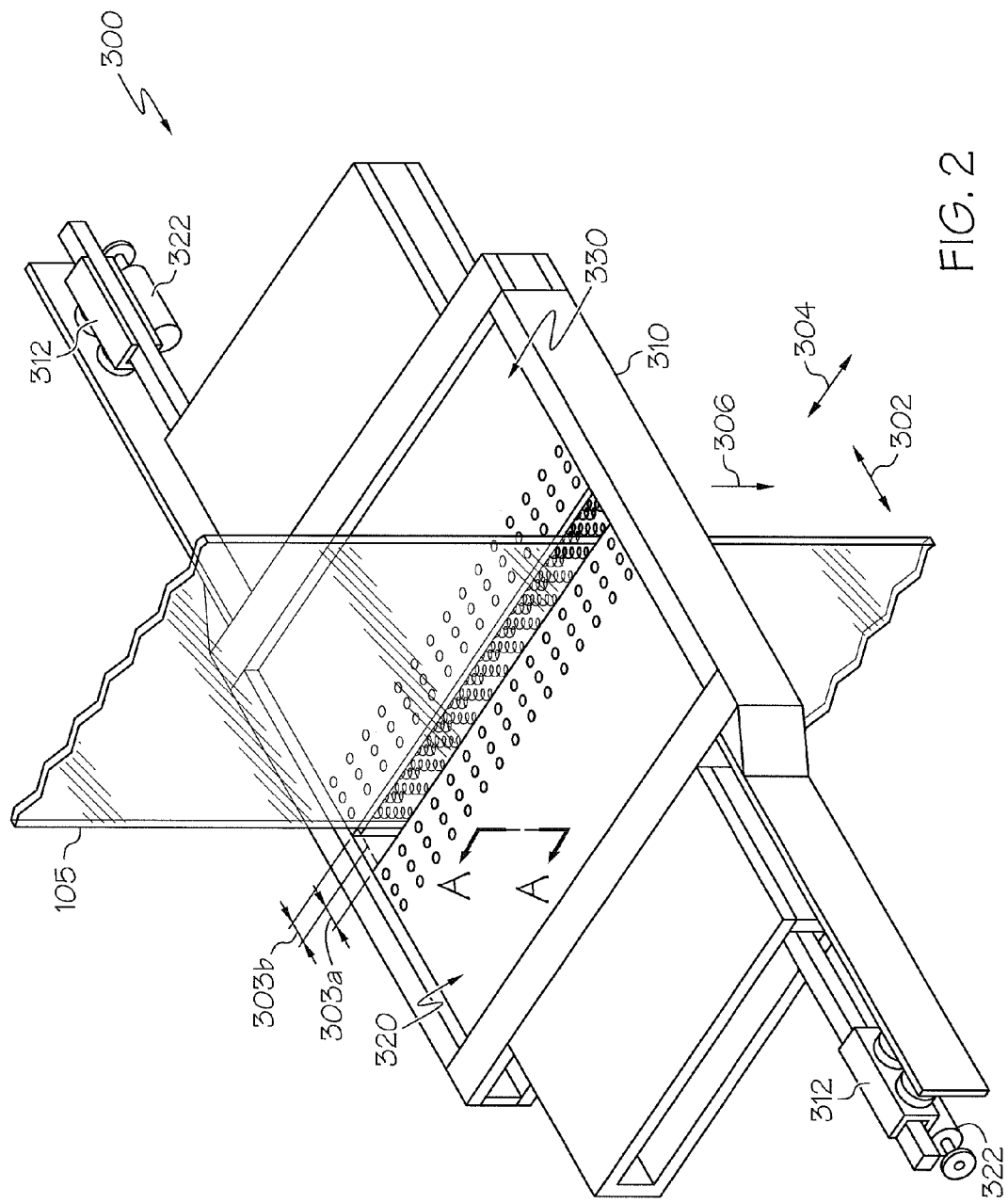
FIG. 2 schematically depicts a perspective view of a repositionable heater assembly through which a glass ribbon travels according to one or more embodiments shown or described herein.

Referring now to FIG. 2, the repositionable heater assembly 300 is shown isolated from other components of the glass manufacturing apparatus 100 depicted in FIG. 1. The repositionable heater assembly 300 includes a support frame 310, a first sled 320, and a second sled 330, each of the first sled 320 and the second sled 330 coupled to the support frame 310 with a bearing member 312. In some embodiments, the support frame 310 of the repositionable heater assembly 300 provides a fluid-sealed environment around the glass ribbon 105, such that environmental leakage from the glass draw operation is minimized and/or eliminated. The bearing member 312 constrains motion of the first sled 320 and the second sled 330 such that the first sled 320 and the second sled 330 are free to translate in a longitudinal direction 302 and are constrained from moving in the lateral direction 304 and the down-draw direction 306.

The repositionable heater assembly 300 also includes a first actuator 322 that is coupled to the support frame 310 and the first sled 320. Similarly, the repositionable heater assembly 300 includes a second actuator 332 that is coupled to the support frame 310 and the second sled 330. The first actuator 322 and the second actuator 332 control the position of the first sled 320 and the second sled 330, respectively, in the longitudinal direction 302, such that spacing distance 303a, 303b between the first sled 320 and the glass ribbon 105 and the second sled 330 and the glass ribbon 105 can be controlled. The first actuator 322 and the second actuator 332 may be selected from a variety of actuators controlling motion in a linear direction including, for example and without limitation, ball screws, pneumatic or hydraulic actuators, linear servo motors, and manual or automated gear-and-pinion drive systems. Additionally, while depicted embodiments of the repositionable heater assembly include the first actuator 322 and the second actuator 332, it should be understood that embodiments of the repositionable heater assemblies may solely incorporate a first actuator that is coupled to both the first sled and the second sled through a linkage or other translation control device (not shown) that provides positional control of the first sled and the second sled through the first actuator.

Figure 3:
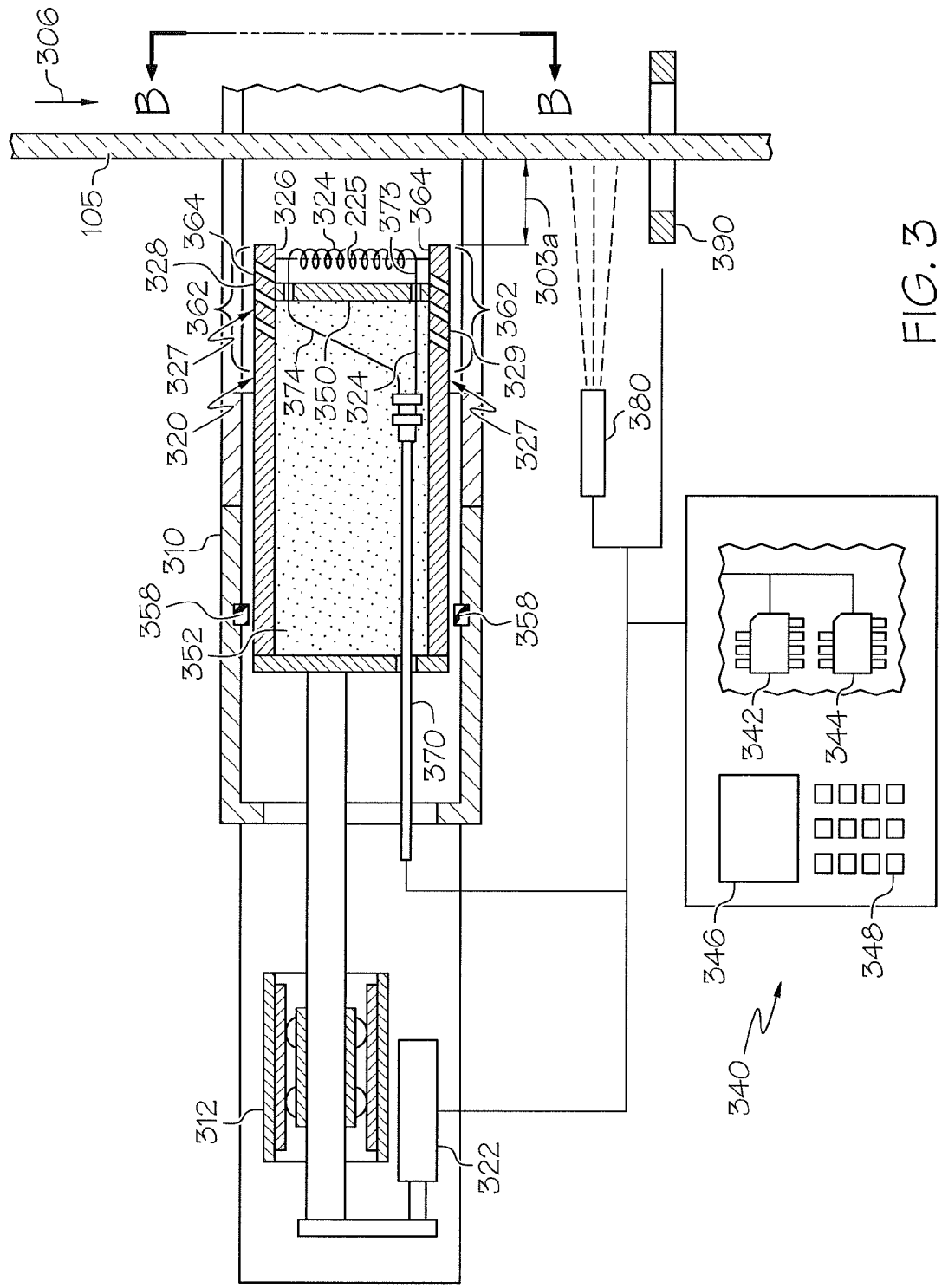
FIG. 3 schematically depicts a cross-sectional side view of the repositionable heater assembly through which the glass ribbon travels shown along line A-A of FIG. 2.

Referring now to FIG. 3, the first sled 320 and the glass ribbon 105 are shown in greater detail. While reference is made to the components of the first sled 320, it should be understood that the second sled 330, as depicted in FIG. 2, may include equivalent components to the first sled 320. The first sled 320 includes a plurality of heating elements 324 that are arranged along an interior-facing region of the first sled 320 that is positioned proximate to the glass ribbon 105. In embodiments of the repositionable heater assembly 300, the heating elements 324 may be resistive heating elements fabricated from a material that is capable of withstanding continuous operation at elevated temperatures. In one embodiment, temperature proximate to the glass ribbon 105 may be maintained in excess of 800 degrees C. Examples of such materials include nickel alloys, iron alloys, platinum alloys, rhodium alloys, and ceramic materials and coatings. In one embodiment, the heating elements 324 may be made from a Kanthal™ iron-chromium-aluminum alloy available from Sandvik Heating Techology of Hallstahammar, Sweden.

The heating elements 324 may be wound into a helical spiral and arranged along the interior-facing region of the first sled 320. As depicted in FIG. 3, the heating elements 324 may be arranged in a generally vertical orientation such that the winding axis 325 about which the heating elements 324 are wound is oriented in the down-draw direction 306 of the glass ribbon 105, here corresponding to a vertical direction. In some embodiments, multiple heating elements 324 may be ganged together, including by forming offset helical arrangements, such that heat imparted at one location along the first sled 320 may be increased. It should be understood that other orientations and shapes of the heating elements 324 incorporated into the first sled 320 may be used without departing from the scope of the present disclosure.

As depicted in FIG. 3, the heating elements 324 extend from attachment surfaces 327 of the first sled 320. As depicted, the attachment surfaces 327 include an ingress surface 328 (here the top surface) and an egress surface 329 (here the bottom surface). As used herein, the terms "ingress" and "egress" refer to the positioning of components relative to the draw direction of the glass ribbon 105. The ingress surface 328 and the egress surface 329 of the first sled 320 at positions proximate to the heating elements 324 may include a stress-relief region 362. The stress-relief region 362 may include a plurality of perforations 364 formed through the ingress surface 328 and the egress surface 329 of the first sled 320. The perforations 364 may locally increase the flexibility of the ingress surface 328 and the egress surface 329, such that local temperature variation of the ingress surface 328 and/or the egress surface 329 reduces the stresses imparted to the ingress surface 328 and the egress surface 329.

Figure 4:
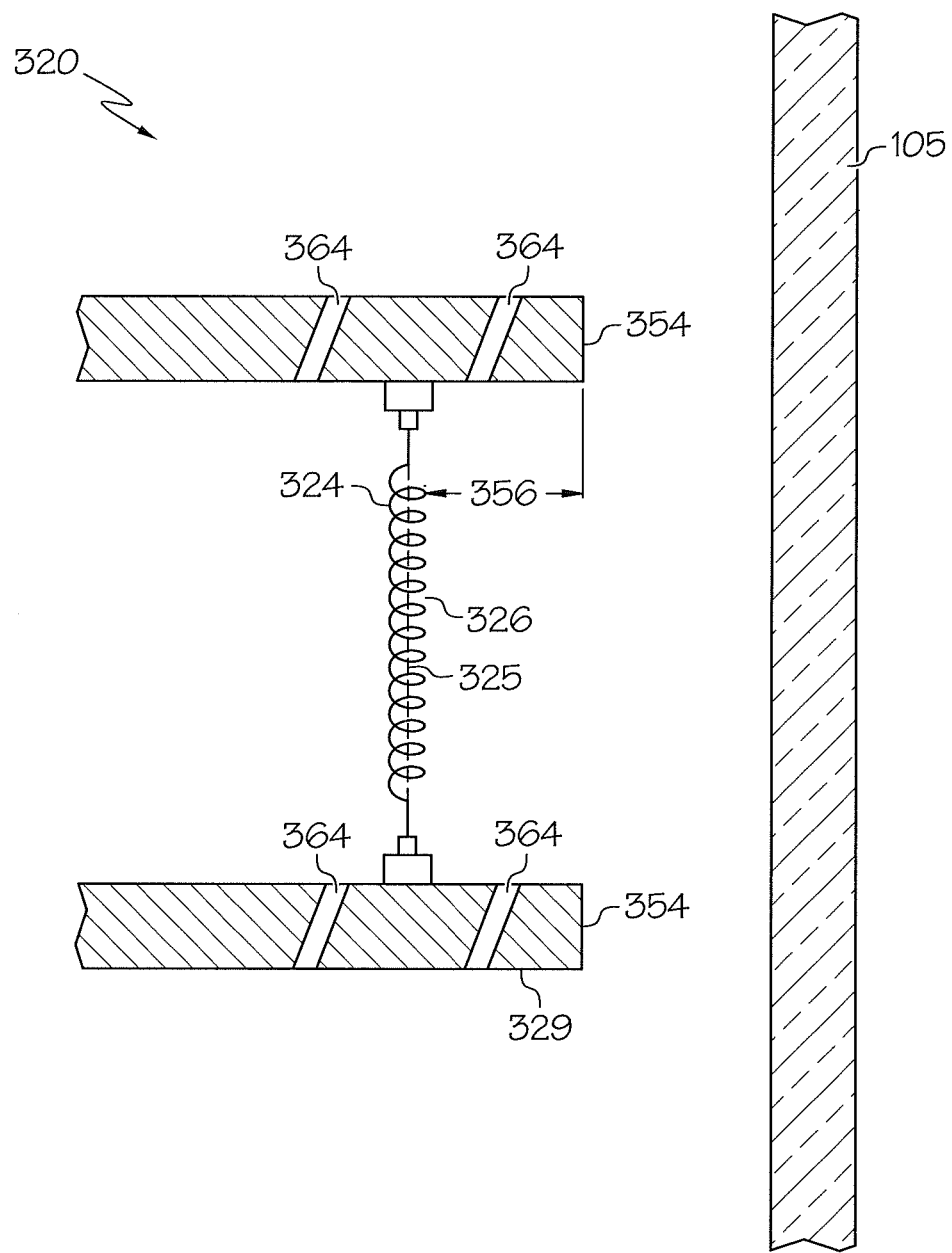
FIG. 4 schematically depicts a detailed cross-sectional side view of the repositionable heater assembly through which the glass ribbon travels shown along line A-A of FIG. 2.

As shown in greater detail in FIG. 4, the heating elements 324 may be positioned offset from a blocking surface 354 of at least one of the ingress surface 328 or the egress surface 329. The blocking surface 354 defines the minimum spacing between the first sled 320 and the glass ribbon 105. As depicted in FIGS. 3 and 4, the heating elements 324 may be positioned inset into the first sled 320. The inward-most surface of the heating elements 324 positioned proximate to the glass ribbon 105 defines a projection surface 326 of the first sled 320. The projection surface 326 is indicative of the minimum distance between the heating elements 324 of the first sled 320 and the glass ribbon 105 passing along the draw apparatus 200 through the repositionable heater assembly 300. As depicted in FIG. 4, the heating elements 324 are inset into the first sled 320 such that a shielding distance 356 between the blocking surface 354 of the first sled 320 and the projection surface 326 defined by the heating elements 324 is maintained.

Among other factors, distance between the glass ribbon 105 and the projection surface 326 of the first sled 320, and therefore the heating elements 324 of the first sled 320, may affect the energy transferred to the glass ribbon 105 due to convection and radiation, as discussed below. Further, the responsiveness of the glass ribbon 105 to temperature change by energy introduced through the heating elements 324 may be affected by the distance between the glass ribbon 105 and the projection surface 326. Accordingly, by modifying the position of the first sled 320 within the repositionable heater assembly 300, precise temperature control of the glass ribbon 105 may be realized, while protecting the heater elements 324 from damage caused by debris.

Heat input to the glass ribbon by the heating elements mounted in the first sled and the second sled is transferred through a combination of conduction, convection, and radiation heat transfer mechanisms. Of particular interest for the repositionable heater assembly is heat transfer attributed to radiation. Without being bound by theory, a radiation view factor is the proportion of the radiation that leaves a first surface and strikes a second surface. In the case of the repositionable heater assemblies of the present disclosure, the view factor is attributed to the individual heating elements and the glass ribbon traveling through the repositionable heater assembly. Modifying the distance between the heating elements and the glass ribbon will change the view factor along the glass ribbon. In particular, by decreasing spacing distance between the heating elements and the glass ribbon, the modification of the view factor will concentrate heat transfer into the glass ribbon at positions proximate to the individual heating element and will decrease the heat transfer into the glass ribbon at positions distal from the heating element. As such, decreasing the distance between the heating elements and the glass ribbon will localize the geometric space that an individual heating element introduces heat to. Further, decreasing the spacing distance between the heating elements and the glass ribbon decreases heat transfer into the glass ribbon from neighboring heating elements. Localizing the geometric space about which an individual heating element introduces heat to may allow for more control of the temperature across the width of the glass ribbon. Individual heating elements may have a more local effect on the temperature of the glass ribbon when the spacing distance between the heating elements and the glass ribbon is comparatively small as compared to when the spacing distance between the heating elements and the glass ribbon is comparatively large.

In addition, decreasing the distance between the heating elements and the glass ribbon may increase the heat input to the glass ribbon as compared to heating elements spaced further from the glass ribbon for a fixed power input to the heating elements. The increase in heat input may increase the temperature of the glass ribbon for a fixed power input to the heating elements. Correspondingly, to achieve a similar temperature increase in the glass ribbon, power required to be introduced to heater elements that are closely spaced to the glass ribbon may be less than power required to be introduced to heater elements that are spaced further from the glass ribbon.

The modification in view factor caused by decreasing the spacing distance between the heating elements and the glass ribbon may also increase the responsiveness of the glass ribbon to temperature changes caused by variations in heat introduced by the heating elements. By decreasing the spacing distance between the heating element and the glass ribbon, the view factor increases at positions proximate to the heating element and decreases at positions distal to the heating element. Computer simulation modeling the heat transfer of the glass ribbon as it travels through the repositionable heater assembly has shown that reducing the spacing distance between the heating elements and the glass ribbon both increases the temperature of the glass ribbon and decreases the time in which the temperature change is reflected in the glass ribbon for a fixed heat input to the heating elements. As such, the glass ribbon is more responsive to changes in temperature when heat is introduced by heating elements that are closer spaced to the glass ribbon than heating elements that are spaced further from the glass ribbon.

Additionally, because the heating elements are spaced apart from the blocking surface of the first sled and the second sled, the blocking surface can act as a heat transfer shield, reducing the view factor of the heating elements in the down-draw direction. The blocking surface may also be positioned at a narrow distance from the glass ribbon to reduce convection away from the repositionable heater assembly along or opposite to the down-draw direction of the glass web. By further constraining the heat transfer in the down-draw direction, the effectiveness of heat energy introduced to the glass ribbon at the repositionable heater assembly may be increased.

Referring again to FIG. 3, thermal shielding material 350 may be positioned along the interior of the first sled 320 proximate to the heating elements 324 and opposite the projection surface 326. The thermal shielding material 350 may be selected from a variety of suitable materials including ceramic or various refractory materials. The thermal shielding material 350 may be thermally insulative to slow the introduction of heat from the heating elements 324 into positions of the first sled 320 positioned distally from the heating elements 324. The thermal shielding material 350 may include a plurality of clearance holes passing through the thermal shielding material 350 that allow electrical connection of the heating elements 324.

The first sled 320 may also include a thermal packing material 352 that is positioned within the interior of the first sled 320 distally from the heating elements 324. In one embodiment, the thermal packing material 352 may be a refractory ceramic fiber product, for example Fiberfrax textiles, ropes, braids, wicking, or yarn available from Unifrax of Niagara Falls, N.Y. The thermal packing material 352 may limit fluid flow through the first sled 320 to reduce heat from being introduced from the heating elements 324 to the interior of the first sled 320 due to convection. Additionally, the repositionable heater assembly 300 may include a thermal gasket 358 positioned between the support frame 310 and the first sled 320. The thermal gasket 358 may limit fluid flow between the dynamic interface between the support frame 310 and the first sled 320 to reduce heat transfer due to convection. Reduction of heat introduced to the interior of the first sled 320 and between the support frame 310 and the first sled 320 may reduce the likelihood of damage to components of the repositionable heater assembly 300 and surrounding components caused by elevated temperatures.

As further depicted in FIG. 3, the first sled 320 may include a wiring harness 370 that electrically couples the heating elements 324 to an electric power source (not shown). In some embodiments, the wiring harness 370 may include electrical connectors 373 that protrude through the thermal shielding material 350 to make an electrical connection between the heating elements 324 and the wires 374 of the wiring harness 370.

The repositionable heater assembly 300 also includes an electronic controller 340 that is communicatively coupled to the first actuator 322 and the second actuator 332 (shown in FIG. 2). The electronic controller 340 includes a processor 342 and a memory 344 communicatively coupled to the processor 342. A computer readable instruction set may be stored in the memory 344 and, when executed by the processor 342, provide instructions to at least the first actuator 322 and the second actuator 332 to extend or contract, thereby modifying the position of the first sled 320 and/or the second sled 330 (shown in FIG. 2).

The repositionable heater assembly 300 includes a plurality of ribbon temperature sensors 380 arranged across the width of the glass ribbon 105. The ribbon temperature sensors 380 are non-contact temperature sensors, for example infrared temperature sensors, that measure the temperature of the glass ribbon 105 as the glass ribbon 105 is directed through the repositionable heater assembly 300. The ribbon temperature sensors 380 may be communicatively coupled to the electronic controller 340, such that the electronic controller 340 monitors the temperature of the glass ribbon 105 at various positions across the width of the glass ribbon 105.

Figure 5:
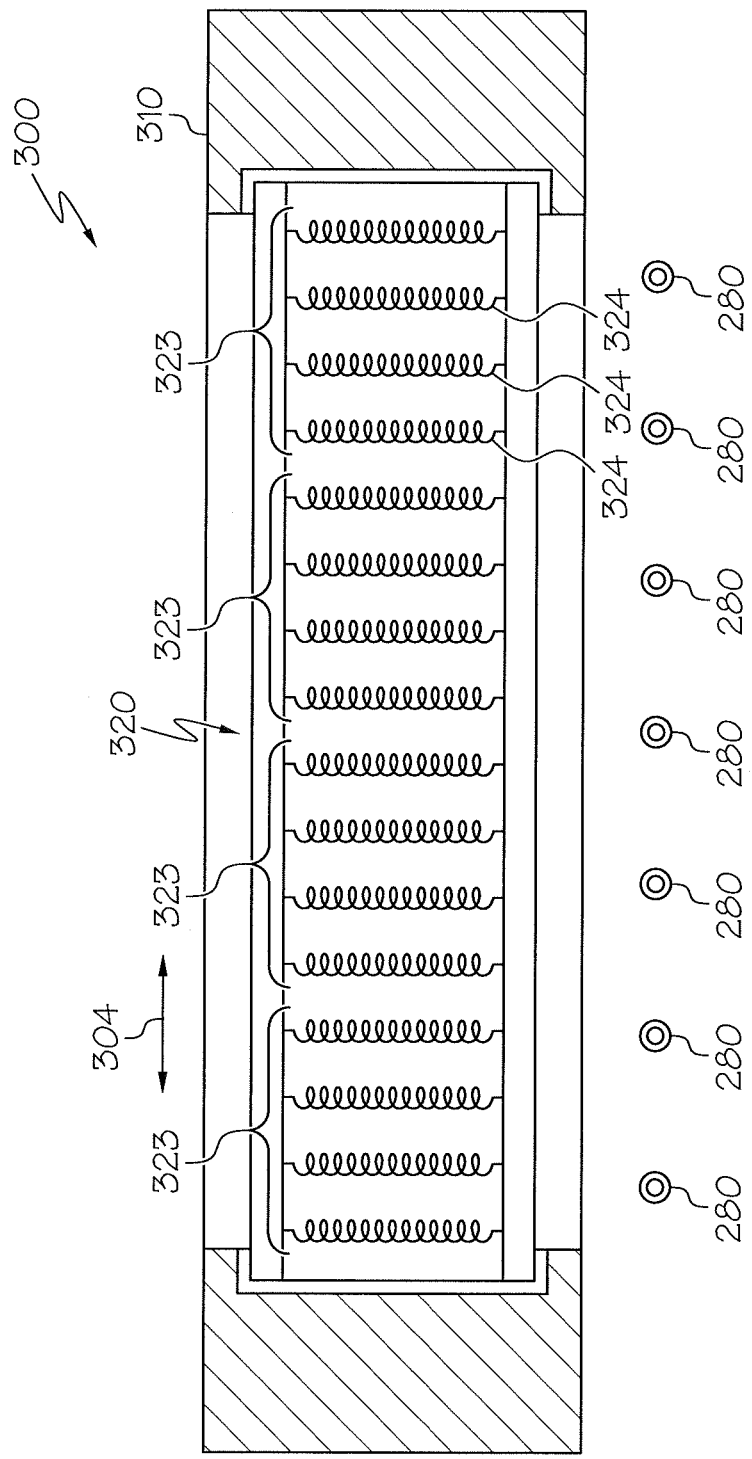
FIG. 5 schematically depicts a cross-sectional rear view of the repositionable heater assembly through which the glass ribbon travels shown along line B-B of FIG. 3.

In some embodiments, the heating elements 324 may be electrically coupled to the electrical power supply through the electronic controller 340. In such embodiments, the electronic controller 340 manages electrical current flowing into the heating elements 324 such that the heat imparted from the heating elements 324 to the glass ribbon 105 is controlled by the electronic controller 340. In some embodiments, operation of each of the heating elements 324 of the repositionable heater assembly 300 are individually controlled. Referring now to FIG. 5, heating elements 324 may be grouped together into a control zone 323, such that the heating elements 324 within any control zone 323 receive equivalent electrical current, and therefore each heating element 324 within a control zone 323 imparts approximately the equivalent heat into the glass ribbon 105. In some embodiments, the heating elements 324 may be segregated into control zones 323 based on the positional proximity of the heating elements 324. In these embodiments, a plurality of control zones 323 of heating elements 324 may be arranged across the width of the glass ribbon 105. For example, in one embodiment, the first sled 320 includes thirty heating elements 324 that are grouped into seven control zones 323 across the width of the first sled 320.

Referring again to FIG. 3, the repositionable heater assembly 300 may also include at least one ribbon parameter sensor 390 that is electronically coupled to the electronic controller 340. The ribbon parameter sensor 390 may sense parameters of the glass ribbon 105, for example thickness and/or width of the glass ribbon 105. An example of the ribbon parameter sensor 390 includes a camera adapted to determine the width of the glass ribbon 105. The ribbon parameter sensor 390 may provide constant monitoring of the parameters of the glass ribbon 105. The ribbon parameter sensor 390 may also assist with automatic determination of out-of-condition glass ribbon 105. If the width of the glass ribbon 105 is out-of-condition, the likelihood of breakage of the glass ribbon 105 increases. Upon automatic determination of an out-of-condition parameter, an operator may determine whether properties of the glass manufacturing apparatus 100 may be modified to bring the measured parameter into condition. If the operator determines that the out-of-condition parameter cannot be corrected, the operator may take steps to stop production of glass ribbon 105 in the glass manufacturing apparatus 100. If the operator determines that unrecoverable failure of the glass ribbon 105 is imminent, the operator may retract the first sled 320 and the second sled 330 away from the glass ribbon 105, such that spacing distance 303a between the heating elements 324 and the glass ribbon 105 is increased. An increase in the spacing distance 303a between the heating elements 324 and the glass ribbon 105 may reduce the likelihood of damage to the heating elements 324 during an unrecoverable failure of the glass ribbon 105. The repositionable heater assembly 300, therefore, may improve ease of operation of the glass manufacturing apparatus 100.

The repositionable heater assembly 300 also include a user interface 346 that is electronically coupled to the processor 342 of the electronic controller 340. The user interface 346 displays parameters of the repositionable heater assembly 300, for example distance between the first sled 320 and the second sled 330 from the glass ribbon 105.

The repositionable heater assembly 300 furthers include a user input device 348. In some embodiments, the user input device 348 may be integrated into the user interface 346. The user input device 348 allows an operator of the glass manufacturing apparatus 100 to modify operating parameters of the repositionable heater assembly 300, to modify the heat input to the glass ribbon 105 as the glass ribbon 105 is directed through the repositionable heater assembly 300. For example, to increase the temperature of the glass ribbon 105, the operator may command through the user input device 348 to increase the electrical current directed to all of the heating elements 324. Further, if the temperature across the width of the glass ribbon 105 falls outside of a targeted range, as indicated by the plurality of ribbon temperature sensors 380, the operator may command through the user input device 348 to increase the electrical current to heating elements 324 positioned proximate to the cool zones of the glass ribbon 105 and/or to decrease the electrical current to heating elements 324 positioned proximate to the hot zones of the glass ribbon 105.

The user input device 348 also allows the operator to selectively reposition the first sled 320 and the second sled 330 (shown in FIG. 2) relative to the glass ribbon 105. The user input device 348 may allow for retraction of the first sled 320 and the second sled 330 away from the glass ribbon 105 should an unrecoverable failure of the glass ribbon 105 be detected in the glass ribbon 105.

Alternatively or in addition, the computer readable instruction set stored in the memory 344 and executed by the processor 342 of the electronic controller 340 may provide automatic control of power delivered to the heating elements 324 and actuation of the first actuator 322 and the second actuator 332, such that heat introduced by the heating elements 324 and spacing distances 303a, 303b between the heating elements 324 and the glass ribbon 105 is managed. The electronic controller 340 may automatically control the power directed to the heating elements 324 to reduce variation in temperature across the width of the glass ribbon 105. Alternatively or in addition, the electronic controller 340 may automatically command the first actuator 322 and the second actuator 332 to translate the first sled 320 and the second sled 330, respectively, to modify the spacing distances 303a, 303b between the heating elements 324 and the glass ribbon 105, such that the temperature of the glass ribbon 105 is maintained at a target level. Further, the electronic controller 340 may simultaneously and automatically control power directed to the heating elements 324 and command the first actuator 322 and the second actuator 332 to translate the first sled 320 and the second sled 330, respectively, such that the temperature of the glass ribbon 105 is maintained while reducing the power consumed by the heating elements 324 of the repositionable heater assembly 300. Reducing the power directed to the heating elements 324 may also increase the life of the heating elements 324 themselves.

It should now be understood that repositionable heater assemblies according to the present disclosure include a plurality of heating elements that are secured within two sleds. The two sleds are supported by bearing members that allows the sleds to translate toward and away from a glass ribbon that passes through the repositionable heater assembly. Actuators control the position of the sleds such that distance between the heating elements and the glass ribbon can be modified. The actuators position the heating elements close to the glass ribbon to improve energy transfer into the glass ribbon and responsiveness of temperature of the glass ribbon to the heating elements. The actuators also position the heating elements away from the glass ribbon when an out-of-parameter condition is detected to reduce the likelihood of damage to the heating elements should the glass ribbon break.

In a first aspect, the disclosure provides a repositionable heater assembly for heating a glass ribbon comprising: a support frame; a first sled and a second sled each coupled to the support frame with bearing members that allow the first sled and the second sled to translate in a longitudinal direction, each of the first sled and the second sled comprising at least one heating element coupled to attachment surfaces, the heating elements spaced apart from the glass ribbon a spacing distance; a first actuator coupled to the first sled and the support frame; and an electronic controller communicatively coupled to the first actuator controlling the spacing distance between the heating elements of the first sled and the glass ribbon.

In a second aspect, the disclosure provides a method of controlling temperature of a glass ribbon in a draw process comprising: drawing a glass ribbon in a visco-elastic state in a down-draw direction through a draw apparatus having a plurality of roller pairs; heating the glass with a repositionable heater assembly, the repositionable heater assembly comprising: a support frame; a first sled and a second sled each coupled to the support frame with bearing members that allow the first sled and the second sled to translate in a longitudinal direction, each of the first sled and the second sled comprising at least one heating element coupled to attachment surfaces, the heating elements spaced apart from the glass ribbon a spacing distance; a first actuator coupled to the first sled and the support frame; and a second actuator coupled to the second sled and the support frame; and controlling the spacing distance between the heating elements of the first sled and the second sled and the glass ribbon with an electronic controller communicatively coupled to the first actuator and the second actuator.

In a third aspect, the disclosure provides the repositionable heater assembly according to the first aspect, further comprising a second actuator coupled to the second sled and the support frame, wherein the electronic controller is communicatively coupled to the second actuator controlling the spacing distance between the heating elements of the second sled and the glass ribbon.

In a fourth aspect, the disclosure provides the repositionable heater assembly according to the first through third aspects, wherein the attachment surfaces comprise a blocking surface positioned in the longitudinal direction between the at least one heating element of the first sled and the glass ribbon.

In a fifth aspect, the disclosure provides the repositionable heater assembly according to the first through fourth aspects, wherein the at least one heating element comprises a plurality of heating elements coupled to the attachment surface and arranged in a lateral direction transverse to the longitudinal direction.

In a sixth aspect, the disclosure provides the repositionable heater assembly according to the fifth aspect, wherein operation of the plurality of heating elements are individually controlled by the electronic controller.

In a seventh aspect, the disclosure provides the repositionable heater assembly according to the fifth aspect, wherein the plurality of heating elements define a plurality of control zones positioned along the first sled and the second sled in the lateral direction, the plurality of heating elements within each of the control zones are operated uniformly, and operation of the plurality of control zones is controlled by the electronic controller.

In an eighth aspect, the disclosure provides the repositionable heater assembly according to the first through seventh aspects, further comprising a ribbon parameter sensor that is communicatively coupled to the electronic controller.

In a ninth aspect, the disclosure provides the repositionable heater assembly according to the first through eighth aspects, further comprising a plurality of ribbon temperature sensors positioned in a lateral direction transverse to the longitudinal direction, the ribbon temperature sensors communicatively coupled to the electronic controller.

In a ninth aspect, the disclosure provides the repositionable heater assembly according to the first through ninth aspects, wherein each of the heating elements comprise a winding axis about which the heating element is curved, and the winding axes of the heating elements are arranged in the down-draw direction.

In a tenth aspect, the disclosure provides the method according to the second aspect, further comprising evaluating a temperature of the glass ribbon at a plurality of positions in a lateral direction transverse to the down-draw direction.

In an eleventh aspect, the disclosure provides the method according to the second and tenth aspects, further comprising modifying electrical current directed to the heating elements to control the heat input to the glass ribbon.

In a twelfth aspect, the disclosure provides the method according to the second and tenth through eleventh aspects, wherein operation of the plurality of heating elements are individually controlled by the electronic controller.

In a thirteenth aspect, the disclosure provides the method according to the second and tenth through twelfth aspects, wherein the plurality of heating elements define a plurality of control zones positioned along the first sled and the second sled in the lateral direction, the plurality of heating elements within each of the control zones are operated uniformly, and operation of the plurality of control zones is controlled by the electronic controller.

In a fourteenth aspect, the disclosure provides the method according to the second and tenth through thirteenth aspects, further comprising reducing a radiation view factor by decreasing the spacing distance between the heating elements of the first sled and the second sled.

In a fifteenth aspect, the disclosure provides the method according to the second and tenth through fourteenth aspects, further comprising: sensing an out-of-condition parameter of the glass ribbon in the draw apparatus; and retracting the first sled and the second sled to increase the spacing distance between the heating elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of controlling temperature of a glass ribbon in a draw process comprising:
   drawing a glass ribbon in a visco-elastic state in a down-draw direction through a draw apparatus having a plurality of roller pairs;
   heating the glass with a repositionable heater assembly, the repositionable heater assembly comprising:
      a support frame;
      a first sled and a second sled each coupled to the support frame with bearing members that allow the first sled and the second sled to translate in a longitudinal direction, each of the first sled and the second sled comprising at least one heating element coupled to attachment surfaces, the heating elements spaced apart from the glass ribbon a spacing distance;
      a first actuator coupled to the first sled and the support frame and communicatively coupled with an electronic controller; and
      a second actuator coupled to the second sled and the support frame and communicatively coupled with the electronic controller;
   sensing an out-of-condition parameter of the glass ribbon in the draw apparatus with at least one out-of-condition parameter sensor communicatively coupled with the electronic controller, wherein the out-of-condition parameter comprises a width of the glass ribbon; and
   controlling the spacing distance between the heating elements of the first sled and the second sled and the glass ribbon with the electronic controller communicatively coupled to the first actuator and the second actuator when the out-of-condition parameter is detected.

2. The method of claim 1, further comprising evaluating a temperature of the glass ribbon at a plurality of positions in a lateral direction transverse to the down-draw direction.

3. The method of claim 2, further comprising modifying electrical current directed to the heating elements to control the heat input to the glass ribbon.

4. The method of claim 1, wherein operation of the plurality of heating elements are individually controlled by the electronic controller.

5. The method of claim 1, wherein the plurality of heating elements define a plurality of control zones positioned along the first sled and the second sled in the lateral direction, the plurality of heating elements within each of the control zones are operated uniformly, and operation of the plurality of control zones is controlled by the electronic controller.

6. The method of claim 1, further comprising reducing a radiation view factor by decreasing the spacing distance between the heating elements of the first sled and the second sled.

7. The method of claim 1, wherein sensing the out-of-condition parameter further comprises sensing a thickness of the glass ribbon in the draw apparatus.

* * * * *